United States Patent
Young et al.

(10) Patent No.: US 7,290,566 B1
(45) Date of Patent: Nov. 6, 2007

(54) DIVERTER VALVE WITH IMPROVED SEAL

(75) Inventors: Lee Edward Young, Salina, KS (US); Jeffrey Lynn Ryser, Salina, KS (US)

(73) Assignee: Salina Vortex Corporation, Salina, KS (US)

( * ) Notice: Subject to any disclaimer, the term of this patent is extended or adjusted under 35 U.S.C. 154(b) by 24 days.

(21) Appl. No.: 10/971,581

(22) Filed: Oct. 22, 2004

(51) Int. Cl.
*F16K 11/22* (2006.01)
(52) U.S. Cl. ...................... 137/875; 406/183
(58) Field of Classification Search ........... 137/625.44, 137/875, 625.31; 406/183
See application file for complete search history.

(56) References Cited

U.S. PATENT DOCUMENTS

| | | | | |
|---|---|---|---|---|
| 1,405,900 | A * | 2/1922 | Cassalette | 137/875 |
| 1,755,464 | A * | 4/1930 | Williams | 137/875 |
| 2,214,736 | A * | 9/1940 | Carmichael et al. | 406/120 |
| 3,384,421 | A * | 5/1968 | Flatt | 406/183 |
| 4,498,528 | A * | 2/1985 | Jacquet | 165/42 |
| 4,598,734 | A * | 7/1986 | Moyes | 137/515.7 |
| 4,979,244 | A * | 12/1990 | Bastenhof | 4/491 |
| 5,120,021 | A * | 6/1992 | Squirrell et al. | 251/298 |
| 5,186,205 | A * | 2/1993 | Bachmann | 137/242 |
| 5,908,047 | A * | 6/1999 | Nakamura et al. | 137/875 |

OTHER PUBLICATIONS

Brochure for Hayes & Stolz on Valves and Gates information located at www.hayes-stolz.com/vlvgte.htm.
Brochure for Meyer Engineered Airlock Technologies on Gravity Flow Diverters located at www.rotaryvalve.com.
Brochure for Kice Industries on Diverter Valves Model 55 and 56 located at www.kice.com/diverter-valves-model55-and-56.htm.
Brochure for Premier Pneumatics, Inc. on 'A' Valve material diverter gate located at www.premierpneumatics.com/divtrA.htm.
Brochure for Shick Tube-Veyor Corporation on two-way Gravity Diverter Valve located at www.shicktube.com/components.html#gdv.
Brochure for Pebco on Single Blade Diverter located at www.pebco.com/ProdPgs/SingleBladeDiverter.html.

* cited by examiner

*Primary Examiner*—John Fox
(74) *Attorney, Agent, or Firm*—Stinson Morrison Hecker LLP

(57) ABSTRACT

A diverter valve for bulk solids is disclosed. The valve has a single inlet and two or more outlets, preferable three. Two pivotal gate valves are used for three outlets so that one is open and two are closed. The valve includes a novel pivotal gate structure which includes a resilient planar component sandwiched between two rigid planar components. The resilient component engages the valve housing so as to avoid metal to metal contact. The invention also includes a seal bar on each side of the housing which presents a linear surface that is perpendicular to the plane of the gate structure so as to present a firm surface against which the gate structure seals. The seal bars for each gate structure are discontinuous so as to accommodate positioning of the other gate structure in a smooth non-deformed sealing relationship to the housing. Additional seal bars engage the top and sides of each gate structure when moved to a "closed" position.

12 Claims, 3 Drawing Sheets

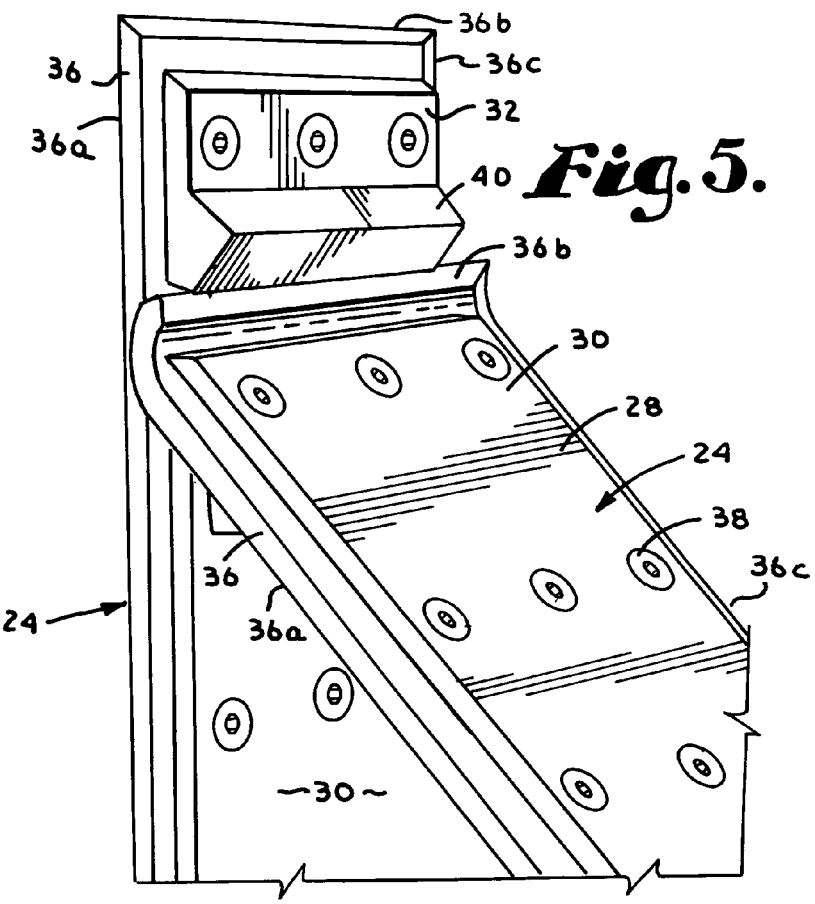
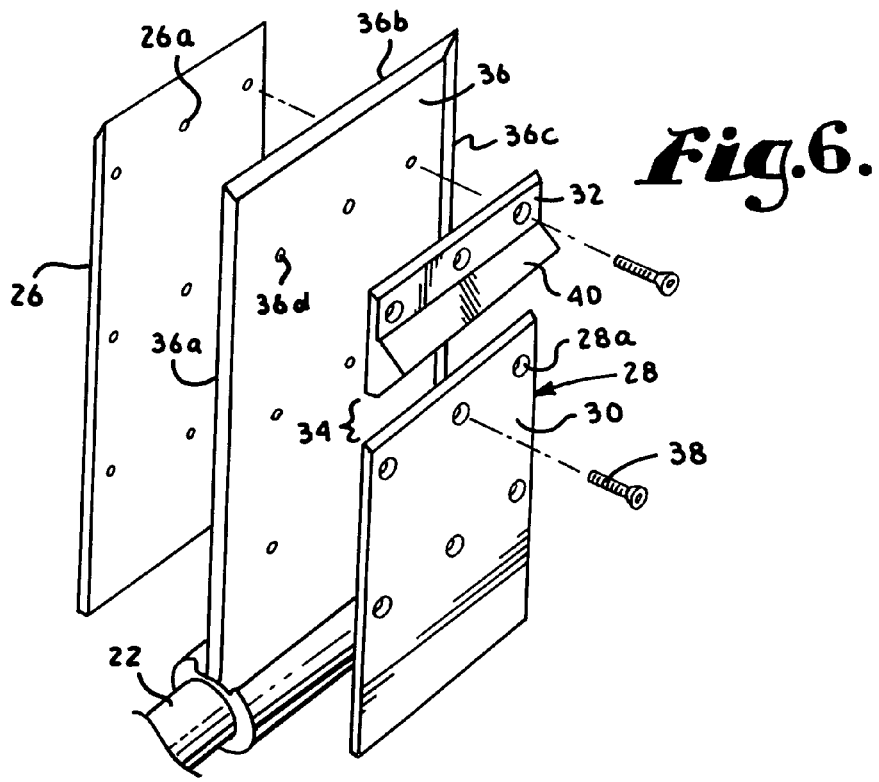

DIVERTER VALVE WITH IMPROVED SEAL

BACKGROUND OF THE INVENTION

This invention relates generally to valves for handling bulk solids and particularly to a pivotal gate valve of the type used in gravity flow applications to divert solid material from one pathway to another.

One or more pivotal diverter valves are utilized in handling bulk solids to direct material between alternate pathways. The problem that has heretofore been encountered, however, is that valves of this type do not seal tightly and some leakage of material occurs around the periphery of the valve gate structure. Also, with traditional diverter gate valves, the leading edge of the gate structure is subject to abrasion from falling material since there is no structure to protect it.

BRIEF SUMMARY OF THE INVENTION

The present invention addresses the deficiencies of prior art diverter valves by providing a pivotal gate structure of a sandwich construction where two rigid planar lamina sandwich a planar resilient component between them so that the resilient material projects from the sides of the pivoting gate to provide a wiping seal that avoids metal on metal contact. One of the rigid lamina is also rigid with a moveable shaft. The other rigid lamina is formed in two sections with a gap between. When one pivoted gate is open, its resilient component rests in the aforementioned gap. A protective shield presented by the upper section of one rigid lamina greatly reduces wear and abrasion of the resilient component.

Thus, the invention encompasses a diverter valve for bulk solids which comprises a housing having an inlet and at least two outlets; gate structure comprising a resilient planar layer which extends around at least the periphery of a rigid planar component which is rigid with a shaft that is moved by a suitable prime mover. Preferably, the gate structure is constructed with two rigid planar lamina, one of which is formed in two sections so as to present a gap which receives the resilient structure of the second pivotal gate so as to protect it from abrasion by the material being handled.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means of the instrumentalities and combinations particularly pointed out in the appended claims.

BRIEF DESCRIPTION OF THE DRAWINGS

FIG. 5 is an enlarged detail view of the pivotal gate structure according to the present invention; and FIG. 6 is an exploded view showing the components of the novel gate structure.

DETAILED DESCRIPTION OF PREFERRED EMBODIMENT

Figure 1:
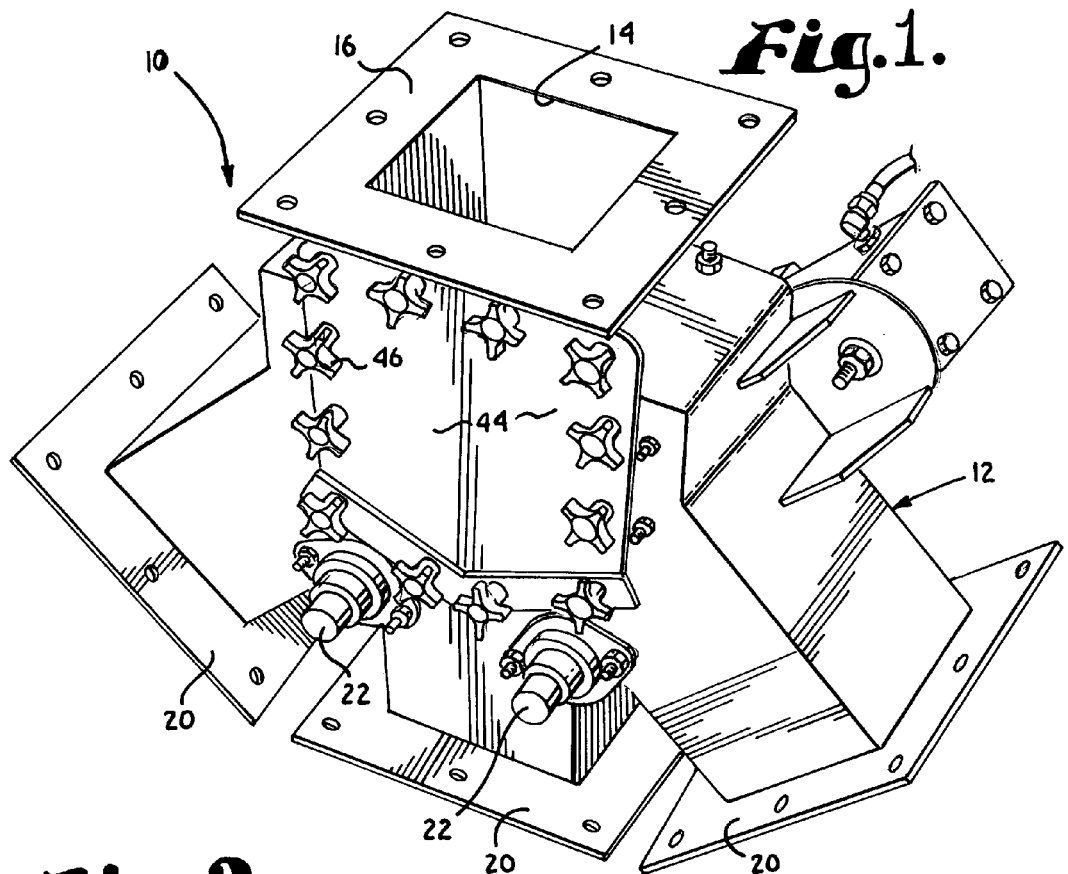
FIG. 1 is a perspective view of a diverter valve according to the present invention taken from one side.

Referring initially to FIG. 1 a diverter valve according to the present invention is designated generally by the number 10. Valve 10 comprises a housing 12 which presents a rectangular inlet 14 defined by a flange 16. Housing 12 also presents three separate rectangular outlets 18 (FIG. 3) surrounded by flanges 20.

Figure 3:
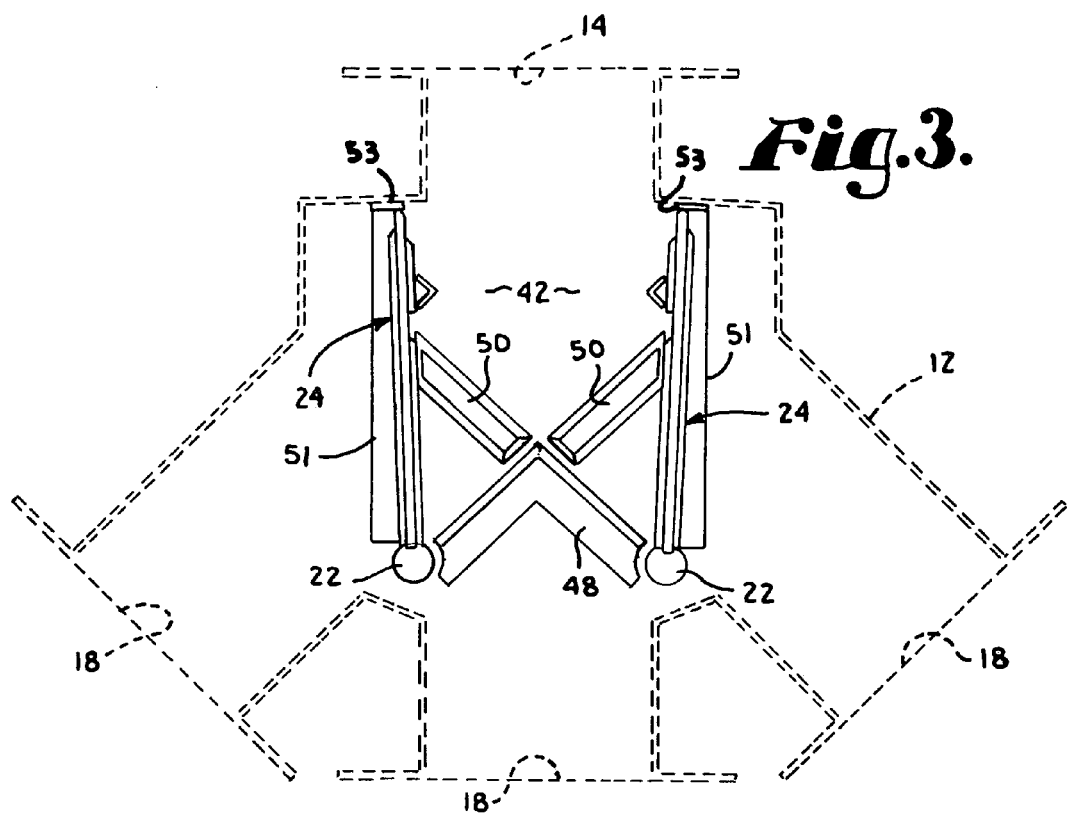
FIG. 3 is a partially schematic illustration of the pivotal gate structures of the present invention with the surrounding housing shown in broken lines demonstrating the "closed" position for both gates.

Referring to FIG. 3, housing 12 mounts rotatable shafts 22 which support first and second gate structures 24. Since the two gate structures are of identical construction, only one will be described in detail. Referring to FIG. 6, gate structure 24 comprises a first rigid planar lamina 26 which is welded or otherwise rigidly secured to shaft 22 and a second rigid planar lamina 28 comprised of a generally rectangular first section 30 and a second section 32 which is spaced apart from the first section so as to present a gap 34. A resilient planar component 36 which is of a dimension greater than that of planar lamina 26 is sandwiched between layers 26 and 28. In this regard, each of planar lamina 26 and 28, as well as resilient planar component 36 are provided with a plurality of aligned apertures, 26a, 36d and 28a respectively for receiving screws 38 which hold the components in tight sandwiched relationship as shown in FIG. 5.

Referring to further details of second section 32 of the second rigid lamina 28, as best seen in FIGS. 5 and 6, this section includes a rectangular component which presents a planar surface which engages resilient planar component 36 and also includes a hip portion 40 which projects from the planar surface in a direction away from resilient component 36.

With reference to FIG. 3, housing 12 defines a central manifold area 42 which communicates with inlet 14 and each of the three outlets 18. With reference to FIG. 1, this manifold area is accessible by removing cover plate 44 which is secured by keepers 46.

Figure 2:
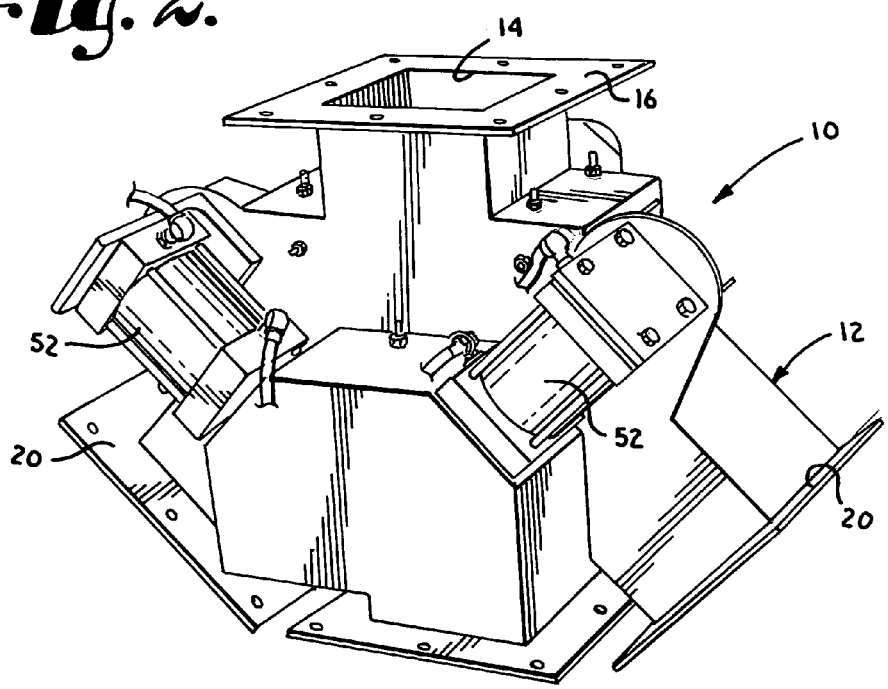
FIG. 2 is a perspective view of the diverter valve taken from the side opposite that shown in FIG. 1.

Referring to FIG. 3, rigidly mounted on one wall of housing 12 is a v-shaped seal bar 48. An identical seal bar (not shown) is located on the opposite wall of the housing. Linear seal bars 50 present a planar surface which is aligned with the planar surface of each leg of seal bar 48. A second pair of linear seal bars 50 is positioned on the backside of cover plate 44 in alignment with the aforementioned second v-shaped seal bar 48. It is to be noted that linear seal bars 50 are spaced from v-shaped seal bars 48 so as to present a "gap" or open area where nothing protrudes from the housing wall. Turning to FIGS. 2 and 3, a pair of pneumatic cylinders 52 are coupled with shafts 22 for operating gates 24.

Two additional seal bars 51 are rigid with housing 12 at the sides of each gate 24 and another seal bar 53 extends horizontally across the housing between two side seal bars 51.

In operation, valve 10 is used to control the flow of bulk solids to one of three different flow paths. To this end, it is to be understood that a conveying duct is coupled to each of outlets 18 and an inlet duct is coupled with inlet 14. Referring to FIG. 3, first and second gate structures 24 are shown in what will be referred to as their closed positions wherein the left and right outlets are blocked and material can flow only from inlet 14 to the outlet 18 immediately opposite the inlet. The term "closed position" is arbitrarily chosen to facilitate description since once a gate structure is moved to an "open position, as shown in FIG. 4, the outlet 18 immediately opposite 14 is closed.

With gate 24 in the closed position illustrated in FIG. 3, resilient planar component 36 will be in sealing engagement with housing 12 along the three sides of the component designated 36a, 36b and 36c in FIGS. 5 and 6. These three sides will be forced against and tightly engage seal bars 51 and 53 on the housing.

When either gate structure 24 is moved to a fully open position, it will engage the opposite gate structure as illustrated in FIG. 5. In this position leading edge 36b of resilient component 36 is positioned in the gap 34 between first and second sections 30 and 32 of the second rigid planar lamina 28. In this position the resilient planar component of the first gate structure 24 engages the resilient component of the second gate structure as best illustrated in FIG. 4. Also, in this position, leading edge 36b of the resilient component underlies hip portion 40 of the second section 32 of the planar lamina so as to protect leading edge 36b from abrasion caused by moving solid material. Closing of the aforementioned gate structure 24 and opening of the other gate structure closes the center outlet 18 and opens the previously closed right outlet 18.

Figure 4:
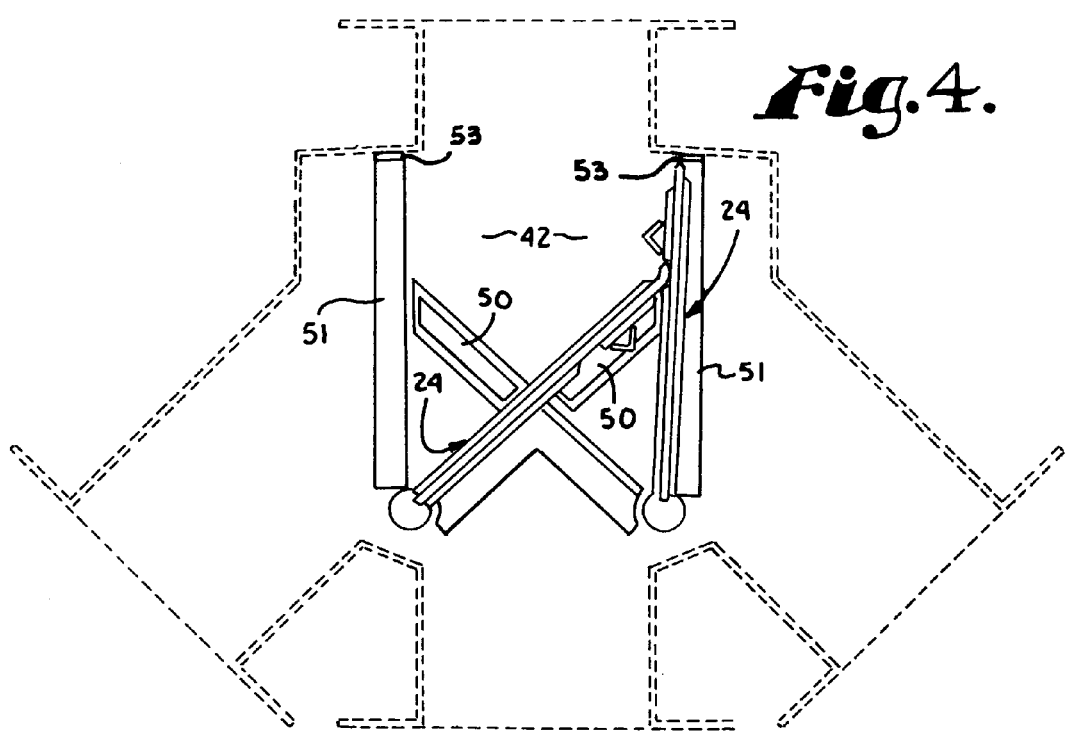
FIG. 4 is another elevational view similar to FIG. 3 but with the pivotal gate structure having been moved from its primary flow blocking position to an "open" position where it rests against a second gate blocking a material pathway.

Also when gate structure 24 is in a fully open position, as illustrated in FIGS. 4 and 5, side edges 36a and 36c of the resilient component 36 will engage the planar surfaces presented by one leg of the v-shaped seal bar 48 and the surface of the linear seal bar 50 which is aligned therewith. It is to be understood that while a single set of seal bars 48 and 50 is shown in FIG. 3, there is a corresponding set on the opposite side of the housing so that both edges 36a and 36c are engaged with the housing in the manner described. The seal bars present a surface which is perpendicular to the plane of the gate structure which allows for a positive sealing action to take place when the gate structures are pushed against the surface. In this regard, it is also to be noted that the space between the linear seal bars 50 and the corresponding surfaces of v-shaped seal bar 48 accommodate full engagement of the edges 36a and 36c of the resilient planar component against the housing walls to an extent which would not be possible if there was not the spaced relationship between seal bars 48 and 50. Manifestly, pneumatic cylinders 52 are coupled with each of the aforementioned gate structures to provide a power source for moving the gate structures between open and closed positions.

While the invention has been described with reference to a planar resilient component of rectangular shape with dimensions which project beyond the rigid planar lamina, the invention encompasses a resilient component which is not coextensive with the rigid lamina but still projects from the peripheral edge of the latter. While screws are the preferred means for securing the gate components in removable sandwiched relationship, various other types of fastening mechanisms can be employed. It is also within the scope of the invention to configure housing 12 to present square or other polygonal shaped inlets and outlets rather than rectangular. Pneumatic cylinders will be utilized in most applications although other types of prime movers can be employed for moving gate structure 24.

From the foregoing it will be seen that this invention is one well adapted to attain all ends and objectives hereinabove set forth, together with the other advantages which are obvious and which are inherent to the invention.

Since many possible embodiments may be made of the invention without departing from the scope thereof, it is to be understood that all matters herein set forth or shown in the accompanying drawings are to be interpreted as illustrative, and not in a limiting sense.

While specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without reference to other features and subcombinations. This is contemplated by and is within the scope of the claims.

What is claimed and desired to be secured by Letters Patent is as follows:

1. A diverter valve for bulk solids comprising:
    a housing presenting an inlet and first, second, and third outlets;
    first gate structure moveable between a first position which blocks said first outlet and a second position wherein said first outlet is open;
    second gate structure moveable between a first position which blocks said second outlet and a second position wherein said second outlet is open,
    each of said first and second gate structures blocking said third outlet when the gate structure is in its second position,
    each of said gate structures comprising a rigid planar component having an edge which is spaced from said housing and a peripheral resilient component, said resilient component projecting from said edge of said planar component to present a wiping seal against said housing;
    a first seal bar mounted on said housing and extending substantially around said resilient component of said first gate structure when said first gate structure is in its first position, wherein said resilient component sealably engages said first seal bar when said first gate structure is in its first position;
    a second seal bar mounted on said housing and extending substantially around said resilient component of said second gate structure when said second gate structure is in its first position, wherein said resilient component sealably engages said second seal bar when said second gate structure is in its first position; and
    a pair of third seal bars on said housing for engagement by the resilient component of each of said gate structures when the latter is in its second position, wherein each of said third seal bars is discontinuous and presents an open space for receiving said resilient component when the latter is in sealing engagement with said third seal.

2. The invention of claim 1, wherein said outlets and said gate structures are rectangular and said resilient component comprises three sides projecting from said edge of said rigid planar component to present a wiping seal against said housing, wherein said first and second seal bars each comprise a horizontal segment mounted on said housing and two side segments mounted on opposite walls of said housing, wherein each projecting side of said resilient component of said first gate structure sealably engages one segment of said first seal bar when said gate structure is in its first position, and wherein each projecting side of said resilient component of said second gate structure sealably engages one segment of said second seal bar when said gate structure is in its first position.

3. The invention of claim 1, wherein is included first and second prime movers, each being operable to move one of said gate structures between said first and second positions.

4. The invention of claim 1, wherein each third seal bar comprises a v-shaped segment and a pair of linear segments, wherein each linear segment aligns with a leg of said v-shaped segment, and wherein each linear segment is spaced from said v-shaped segment to present an open area for receiving said resilient component when the latter is in sealing engagement with said third seal bar.

5. A diverter valve for bulk solids comprising:
   a housing presenting an inlet and first, second, and third outlets;
   first gate structure moveable between a first position which blocks said first outlet and a second position wherein said first outlet is open;
   second gate structure moveable between a first position which blocks said second outlet and a second position wherein said second outlet is open,
   each of said first and second gate structures blocking said third outlet when the gate structure is in its second position,
   each of said gate structures comprising a rigid planar component having an edge which is spaced from said housing and a peripheral resilient component, said resilient component projecting from said edge of said planar component to present a wiping seal against said housing;
   wherein each of said gate structures comprises a shaft pivotally mounted on said housing and said rigid planar component comprises a first lamina rigid with said shaft and a second lamina secured to said first lamina with said resilient component comprising a sheet sandwiched between said first and second lamina, wherein said second lamina comprises first and second spaced apart sections with a gap therebetween, said resilient component of said first gate structure engaging said resilient component of said second gate structure at said gap when the former is in a second position and the latter is in a first position;
   a first seal bar mounted on said housing and extending substantially around said resilient component of said first gate structure when said first gate structure is in its first position, wherein said resilient component sealably engages said first seal bar when said first gate structure is in its first position; and
   a second seal bar mounted on said housing and extending substantially around said resilient component of said second gate structure when said second gate structure is in its first position, wherein said resilient component sealably engages said second seal bar when said second gate structure is in its first position.

6. The invention of claim 5, wherein said second section of said second lamina comprises a hip portion which projects from the plane of said second lamina to overlie said resilient component of said first gate structure when the latter is positioned in said gap.

7. The invention of claim 6, wherein is included a pair of third seal bars on said housing for engagement by the resilient component of each of said gate structures when the latter is in its second position.

8. The invention of claim 7, wherein each third seal bar comprises a v-shaped segment and a pair of linear segments, wherein each linear segment aligns with a leg of said v-shaped segment, and wherein each linear segment is spaced from said v-shaped segment to present an open area for receiving said resilient component when the latter is in sealing engagement with said third seal bar.

9. The invention of claim 8, wherein said outlets and said gate structures are rectangular and said resilient component comprises three sides projecting from said edge of said planar component to present a wiping seal against said housing, wherein said three projecting sides of said resilient component of said first gate structure sealably engage said first seal bar when said first gate structure is in its first position, wherein said three projecting sides of said resilient component of said second gate structure sealably engage said second seal bar when said second gate structure is in its first position, and wherein parallel projecting sides of said resilient component of each gate structure sealably engage said third seal bars when said gate structure is in its second position.

10. A diverter valve for bulk solids comprising:
    a housing presenting an inlet and first, second, and third outlets, said outlets being rectangular in cross section;
    first gate means moveable between a first position for blocking said first outlet and a second position for blocking said second outlet, said first outlet being open when said second outlet is blocked;
    second gate means moveable between a first position for blocking said third outlet and a second position for blocking said second outlet, said third outlet being open when said second outlet is blocked,
    each of said gate means comprising a rigid planar component having an edge which is spaced from said housing and a peripheral resilient component which extends beyond said rigid planar component on three sides to present a wiping seal against said housing;
    wherein each of said first and second gate means comprises a shaft pivotally mounted on said housing and said rigid planar component comprises a first lamina rigid with said shaft and a second lamina secured to said first lamina with said resilient component comprising a sheet sandwiched between said first and second lamina, wherein said second lamina comprises first and second spaced apart sections with a gap there between, said resilient component of said first gate means engaging said resilient component of said second gate means at said gap when the former is in a second position and the latter is in a first position;
    a first seal bar mounted on said housing and extending substantially around said resilient component of said first gate means when said first gate means is in its first position, wherein said resilient component sealably engages said first seal bar when said first gate means is in its first position;
    a second seal bar mounted on said housing and extending substantially around said resilient component of said second gate means when said second gate means is in its first position, wherein said resilient component sealably engages said second seal bar when said second gate means is in its first position; and
    means for moving said first gate means and said second gate means between said first and second positions.

11. The invention of claim 10, wherein is included a pair of third seal bars on said housing for engagement by said resilient component of each of said gate means when the latter is in its second position.

12. The invention of claim 10, wherein said second section of said second lamina comprises a hip portion which projects from the plane of said second lamina to overlie said resilient component of said first gate means when the latter is positioned in said gap.

* * * * *